United States Patent
Titus et al.

(10) Patent No.: US 10,824,457 B2
(45) Date of Patent: Nov. 3, 2020

(54) HIGH AVAILABILITY FOR VIRTUAL MACHINES

(71) Applicant: AVAGO TECHNOLOGIES INTERNATIONAL SALES PTE. LIMITED, Singapore (SG)

(72) Inventors: Tony Devadason Titus, Milpitas, CA (US); Samir Bhattacharya, Pleasanton, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 217 days.

(21) Appl. No.: 15/941,665

(22) Filed: Mar. 30, 2018

(65) Prior Publication Data

US 2018/0225140 A1 Aug. 9, 2018

Related U.S. Application Data

(63) Continuation of application No. PCT/US2017/033142, filed on May 17, 2017.

(60) Provisional application No. 62/343,744, filed on May 31, 2016.

(51) Int. Cl.
| | | |
|---|---|---|
| G06F 9/46 | (2006.01) | |
| G06F 9/455 | (2018.01) | |
| G06F 9/50 | (2006.01) | |
| G06F 11/20 | (2006.01) | |
| G06F 11/07 | (2006.01) | |
| G06F 11/14 | (2006.01) | |

(52) U.S. Cl.
CPC ........ *G06F 9/45558* (2013.01); *G06F 9/50* (2013.01); *G06F 11/0712* (2013.01); *G06F 11/0757* (2013.01); *G06F 11/1484* (2013.01); *G06F 11/2023* (2013.01); *G06F 2009/45575* (2013.01); *G06F 2009/45591* (2013.01); *G06F 2009/45595* (2013.01); *G06F 2201/815* (2013.01)

(58) Field of Classification Search
CPC .... G06F 9/45558; G06F 9/50; G06F 11/0757; G06F 11/1484; G06F 11/2023
USPC .......................................................... 718/1
See application file for complete search history.

(56) References Cited

U.S. PATENT DOCUMENTS

| | | | |
|---|---|---|---|
| 4,827,411 A | * | 5/1989 | Arrowood ............... H04L 29/00 |
| 7,370,324 B2 | | 5/2008 | Goud et al. |
| 8,135,985 B2 | | 3/2012 | Mishra et al. |

(Continued)

FOREIGN PATENT DOCUMENTS

| | | |
|---|---|---|
| WO | 2010144316 A1 | 12/2010 |
| WO | 2017209955 A1 | 12/2017 |

OTHER PUBLICATIONS

PCT/US2017/033142, "International Search Report and Written Opinion", dated Aug. 23, 2017, 8 pages.

(Continued)

*Primary Examiner* — Camquy Truong
(74) *Attorney, Agent, or Firm* — Xsensus LLP

(57) ABSTRACT

Systems, methods, apparatus, and a computer-readable medium are described for generating and receiving information regarding the current state of the active virtual machine in the host and switching the standby virtual machine from standby to active in response to determining that the current active virtual machine may no longer be able to service network packets.

20 Claims, 8 Drawing Sheets

(56) References Cited

U.S. PATENT DOCUMENTS

| | | |
|---|---|---|
| 8,495,418 B2 | 7/2013 | Abraham et al. |
| 8,650,564 B2 | 2/2014 | Huang et al. |
| 8,677,353 B2 | 3/2014 | Machida |
| 8,769,535 B2 | 7/2014 | Mani |
| 8,806,266 B1 | 8/2014 | Qu et al. |
| 8,843,717 B2 | 9/2014 | McNeeney et al. |
| 8,873,375 B2 | 10/2014 | Kim et al. |
| 8,954,645 B2 | 2/2015 | North et al. |
| 9,020,895 B1 | 4/2015 | Rajashekar et al. |
| 9,021,459 B1 | 4/2015 | Qu |
| 9,021,494 B2 * | 4/2015 | Nord .................. G06F 9/5077 718/104 |
| 9,037,719 B2 | 5/2015 | Shen et al. |
| 9,110,864 B2 | 8/2015 | Jamjoom et al. |
| 9,128,884 B2 | 9/2015 | Forgette et al. |
| 9,286,097 B2 | 3/2016 | Rothman et al. |
| 9,448,899 B2 | 9/2016 | Fu |
| 9,459,895 B2 | 10/2016 | Venkitachalam et al. |
| 9,465,634 B2 | 10/2016 | Yoshida et al. |
| 9,529,661 B1 | 12/2016 | Miller |
| 10,230,785 B1 * | 3/2019 | Gadalin .................. H04L 67/32 |
| 2002/0013802 A1 | 1/2002 | Mori et al. |
| 2004/0255048 A1 * | 12/2004 | Lev Ran .................. G06F 9/546 709/249 |
| 2007/0094659 A1 | 4/2007 | Singh et al. |
| 2007/0143686 A1 * | 6/2007 | Branson .................. G06F 9/451 715/733 |
| 2010/0058342 A1 * | 3/2010 | Machida ............... G06F 9/5077 718/1 |
| 2011/0167298 A1 | 7/2011 | Lee |
| 2011/0191627 A1 | 8/2011 | Koning et al. |
| 2012/0023309 A1 | 1/2012 | Vineet et al. |
| 2013/0159580 A1 | 6/2013 | Dong et al. |
| 2013/0275805 A1 | 10/2013 | Harper et al. |
| 2013/0275808 A1 | 10/2013 | McNeeney et al. |
| 2014/0007097 A1 | 1/2014 | Chin et al. |
| 2015/0149813 A1 | 5/2015 | Mizuno et al. |
| 2015/0334126 A1 * | 11/2015 | Mooring ............. G06F 9/45558 726/1 |
| 2015/0363278 A1 | 12/2015 | Harris et al. |
| 2019/0087244 A1 * | 3/2019 | Turner ..................... G06F 8/61 |

OTHER PUBLICATIONS

Seishiro Hamanaka "High-Reliability, High-Availability Cluster System Supporting Cloud Environment" Fijitsu Sci. Tech. J., vol. 51, No. 2, pp. 86-91, Apr. 2015, 6 pages.

Scott Weblog "BC2621: Fault-Tolerant VMs in VI: Operations and Best Practices" pulled from the internet: https://blog.scottlowe.org/2008/09/16/bc2621-fault-tolerant-vms-in-vi-operations-and-best-practices/ VMware, Sep. 16, 2008, 7 pages.

ETSI Standard "Network Functions Virtualisation (NFV); Resiliency Requirements" ETSI GS NFV-REL 001 V1.1.1, Jan. 2015, 82 pages.

Oracle "Oracle VM 3 :Integrating Oracle VM into a Disaster Recovery Solution using SAN" Nov. 2012, 46 pages.

VMware "Virtual Machine Failure Monitoring" VMware, Inc. Palo Alto, CA, Copyright © 2007, 3 pages.

Elden Christensen "Evaluating High-Availability (HA) vs. Fault Tolerant (FT) Solutions" , pulled from the internet https://blogs.msdn.microsoft.com/clustering/2010/10/05/evaluating-high-availability-ha-vs-fault-tolerant-ft-solutions/ Microsoft, Oct. 5, 2010, 5 pages.

Matthias Richly "Dependable Systems 2010 Virtualization Fault Tolerance" Hasso Plattner Institute, 2010, 19 pages.

Anonymous: Kerne 1-based Virtual Machine—Wikipedia, the free encyclopedia, Apr. 11, 2016 (Apr. 11, 2016), XP055574325, Retrieved from the Internet: URL:http://web.archive.org/web/20160411053301/https://en.wikipedia.org/wiki/Kernel-based Virtual Machine [retrieved on Mar. 26, 2019] *p. 1-p. 3*.

Supplementary European Search Report dated Apr. 4, 2019, issued in European Application No. 17807216.1.

* cited by examiner

HIGH AVAILABILITY FOR VIRTUAL MACHINES

CROSS-REFERENCES TO RELATED APPLICATIONS

This application is a (bypass) continuation of International Application No. PCT/US2017/033142, filed May 17, 2017, entitled, "HIGH AVAILABILITY FOR VIRTUAL MACHINES," which claims benefit and priority of U.S. Provisional Application No. 62/343,744, filed May 31, 2016, entitled, "HIGH AVAILABILITY FOR VIRTUAL MACHINES." The entire content of the PCT/US2017/033142 and 62/343,744 applications are incorporated herein by reference for all purposes

BACKGROUND

The present disclosure generally relates to computing devices and systems, and more specifically, improving high availability of network devices.

Generally, no robust techniques exist for switching between active and standby guests on a network device. Lack of robust techniques for switching between active guests and standby guests results in poor responsiveness of a device. For example, a network device may start dropping packets due to its inability to continue to service packets, since switching the standby guest to active guest may take a relatively considerable amount of time, unacceptable in a high availability environment.

SUMMARY

The present disclosure relates generally to networking technologies, and more particularly to high availability of virtual machines for processing network packets.

An example device may include an active guest (e.g., virtual machine) for performing a plurality of operations. In certain embodiments, the example device may be a network device and the active guest may process network packets. The device may also include a standby guest that does not perform the operations performed by the active guest. For example, the active guest may process network packets, whereas the standby guest may not process network packets. The device may also include a monitor configured to receive an event from an active guest, determine based on the event to switch the standby guest to the active guest, and switch the standby guest to active guest.

The monitor may be further configured to attach the hardware resources to the new active guest, such as networking resource and/or a display console. The event generated and monitored by the monitor may be a guest operating system panic event, guest process panic event, watchdog timer event, and/or a ping event.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs. The present disclosure relates generally to networking technologies, and more particularly to high availability of guests and/or virtual machines for processing network packets.

Generally, no robust techniques exist for switching active-standby guests (e.g., virtual machines) upon a catastrophic event in the active guest. Lack of robust techniques for switching between active guests and standby guests results in poor responsiveness of a device. For example, a network device may start dropping packets due to its inability to continue to service packets, since switching the standby guest to active guest may take a relatively considerable amount of time, unacceptable in a high availability environment.

Systems, methods, apparatus, and computer-readable medium are described for generating and receiving information regarding the current state of the active guest in the host and switching the standby device from standby to active in response to determining that the current active guest may no longer be able to service network packets.

In certain embodiments, aspects disclose use of existing operating system panic and watchdog techniques and existing virtualization technology for providing robust mechanisms for detecting catastrophic events and/or non-responsiveness and performing a switchover/failover between the active-standby guests to resume processing of network packets at a robust pace relative to generally available technologies.

Figure 1:
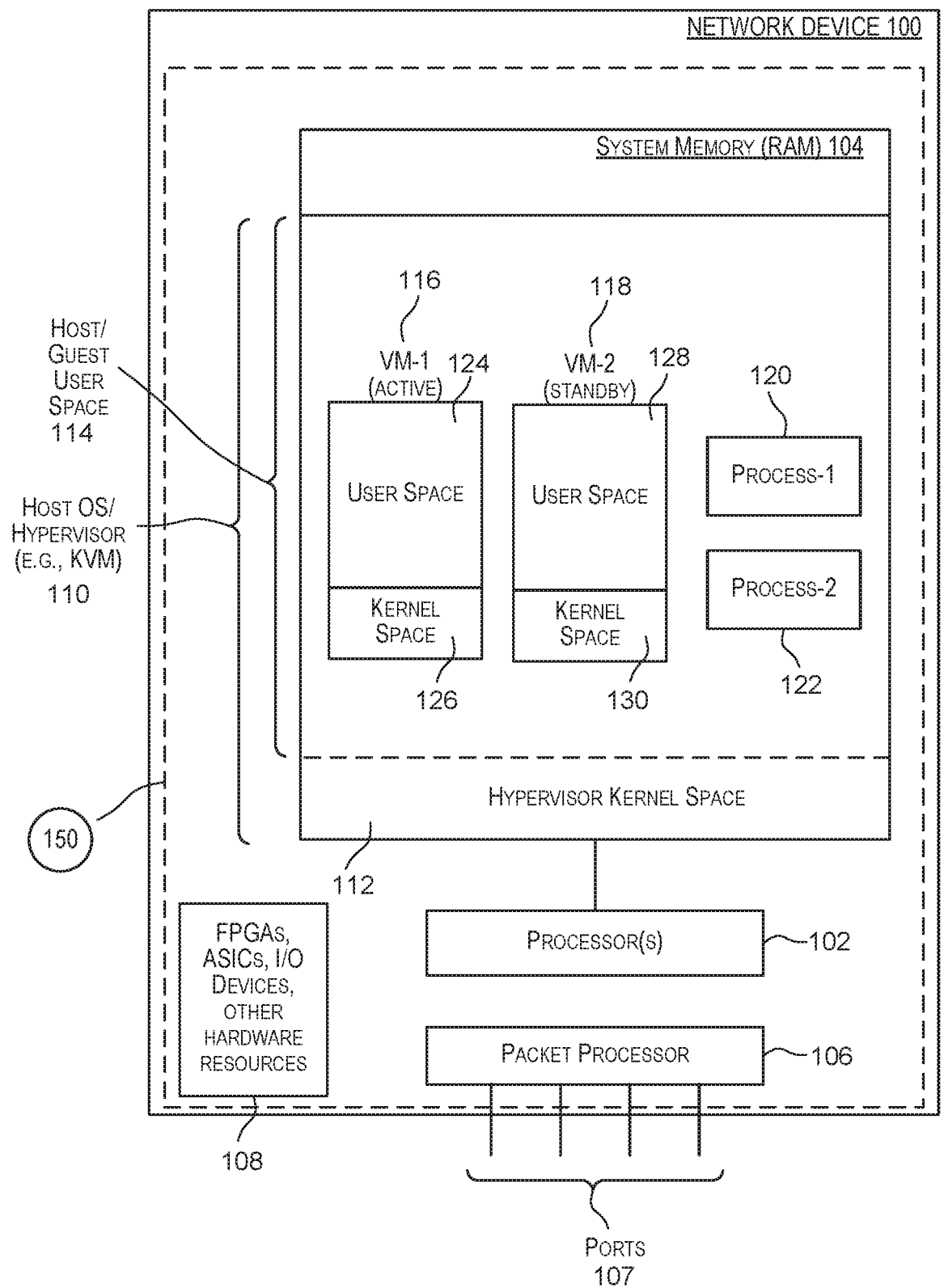
FIG. 1 is a simplified block diagram of a network device that may incorporate teachings disclosed herein according to certain embodiments.
Figure 2:
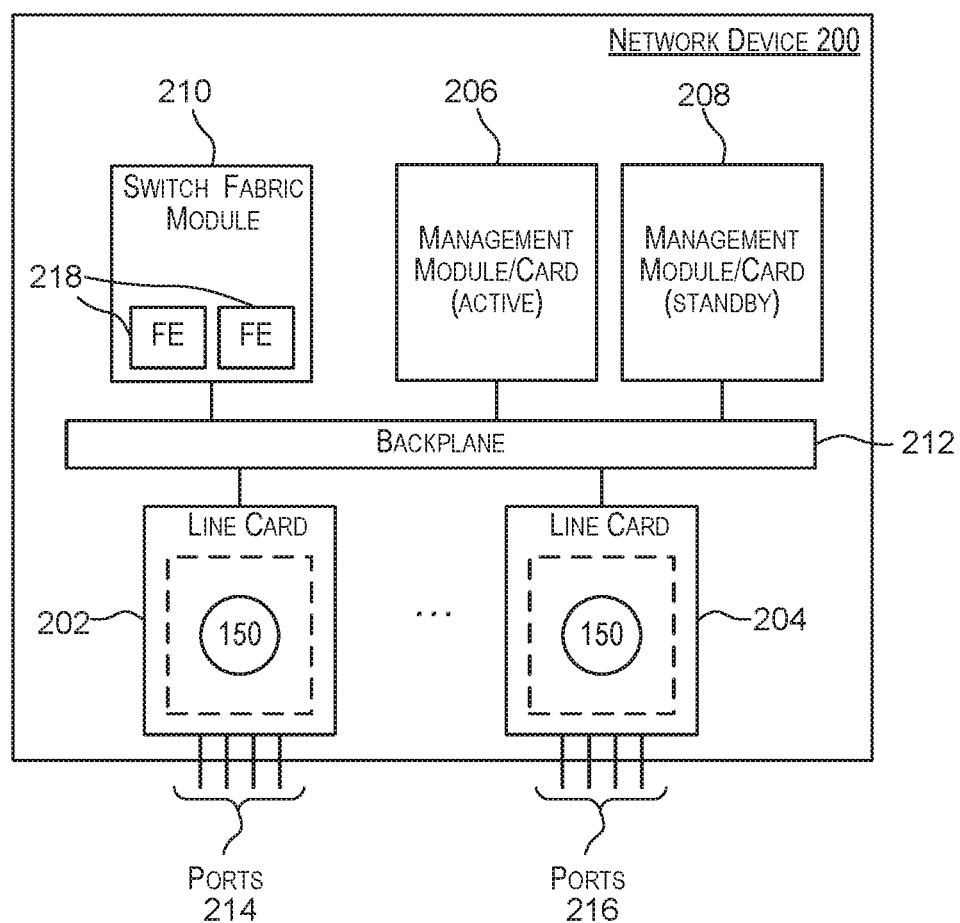
FIG. 2 is a simplified block diagram of yet another example network device.

FIG. 1 and FIG. 2 and their associated description disclose examples, but non-limiting embodiments for implementing systems, methods, apparatus, and computer-readable medium disclosed herein. Furthermore, FIG. 1 and FIG. 2 also describe in more non-limiting detail, aspects of a device, network device, router, switch, guest, virtual machine, active guest/virtual machine, standby guest/virtual machine, active/standby system and switchover/failover event.

FIG. 1 is a simplified block diagram of a network device 100 (also referred to as a "host system") that may incorporate teachings disclosed herein according to certain embodiments. Network device 100 may be any device that is capable of receiving and forwarding packets, which may be data packets or signaling or protocol-related packets (e.g., keep-alive packets). For example, network device 100 may receive one or more data packets and forward the data packets to facilitate delivery of the data packets to their intended destinations. In certain embodiments, network device 100 may be a router or switch such as various routers and switches provided by Brocade Communications Systems, Inc. of San Jose, Calif.

As depicted in FIG. 1, the example network device 100 comprises multiple components including one or more processors 102, a system memory 104, a packet processor or traffic manager 106, and optionally other hardware resources or devices 108. Network device 100 depicted in FIG. 1 is merely an example and is not intended to unduly limit the scope of inventive embodiments recited in the claims. One of ordinary skill in the art would recognize many possible variations, alternatives, and modifications. For example, in some implementations, network device 100 may have more or fewer components than those shown in FIG. 1, may combine two or more components, or may have a different configuration or arrangement of components. Network device 100 depicted in FIG. 1 may also include (not shown) one or more communication channels (e.g., an interconnect or a bus) for enabling multiple components of network device 100 to communicate with each other.

Network device 100 may include one or more processors 102. Processors 102 may include single or multicore processors. System memory 104 may provide memory resources for processors 102. System memory 104 is typically a form of random access memory (RAM) (e.g., dynamic random access memory (DRAM), Synchronous DRAM (SDRAM), Double Data Rate SDRAM (DDR SDRAM)). Information related to an operating system and programs or processes executed by processors 102 may be stored in system memory 104. Processors 102 may include general purpose microprocessors such as ones provided by Intel®, AMD®, ARM®, Freescale Semiconductor, Inc., and the like, that operate under the control of software stored in associated memory.

As shown in the example depicted in FIG. 1, a host operating system 110 may be loaded in system memory 104 and executed by one or more processors 102. Host operating system 110 may be loaded, for example, when network device 104 is powered on. In certain implementations, host operating system 110 may also function as a hypervisor and facilitate management of virtual machines and other programs that are executed by network device 100. Managing virtual machines may include partitioning resources of network device 100, including processor and memory resources, between the various programs. A hypervisor is a program that enables the creation and management of virtual machine environments including the partitioning and management of processor, memory, and other hardware resources of network device 100 between the virtual machine environments. A hypervisor enables multiple guest operating systems (GOSs) to run concurrently on network device 100.

As an example, in certain embodiments, host operating system 110 may include a version of a KVM (Kernel-based Virtual Machine), which is an open source virtualization infrastructure that supports various operating systems including Linux, Windows®, and others. Other examples of hypervisors include solutions provided by VMWare®, Xen®, and others. Linux KVM is a virtual memory system, meaning that addresses seen by programs loaded and executed in system memory are virtual memory addresses that have to be mapped or translated to physical memory addresses of the physical memory. This layer of indirection enables a program running on network device 100 to have an allocated virtual memory space that is larger than the system's physical memory.

In the example depicted in FIG. 1, the memory space allocated to operating system 110 (operating as a hypervisor) is divided into a kernel space 112 and a user space 114 (also referred to as host user space or guest user space). Multiple virtual machines and host processes may be loaded into guest user space 114 and executed by processors 102. The memory allocated to a virtual machine (also sometimes referred to as a guest operating or GOS) may in turn include a kernel space portion and a user space portion. A virtual machine may have its own operating system loaded into the kernel space of the virtual machine. A virtual machine may operate independently of other virtual machines executed by network device 100 and may be unaware of the presence of the other virtual machines.

A virtual machine's operating system may be the same as or different from the host operating system 110. When multiple virtual machines are being executed, the operating system for one virtual machine may be the same as or different from the operating system for another virtual machine. In this manner, hypervisor 110 enables multiple guest operating systems to share the hardware resources (e.g., processor and memory resources) of network device 100.

For example, in the embodiment depicted in FIG. 1, two virtual machines VM-1 116 and VM-2 118 have been loaded into guest user space 114 and are being executed by processors 102. VM-1 116 has a kernel space 126 and a user space 124. VM-2 118 has its own kernel space 130 and user space 128. Typically, each virtual machine has its own secure and private memory area that is accessible only to that virtual machine. In certain implementations, the creation and management of virtual machines 116 and 118 may be managed by hypervisor 110, which may be, for example, KVM. While only two virtual machines are shown in FIG. 1, this is not intended to be limiting. In alternative embodiments, any number of virtual machines may be loaded and executed.

Various other host programs or processes may also be loaded into guest user space 114 and be executed by processors 102. For example, as shown in the embodiment depicted in FIG. 1, two host processes 120 and 122 have been loaded into guest user space 114 and are being executed by processors 102. While only two host processes are shown in FIG. 1, this is not intended to be limiting. In alternative embodiments, any number of host processes may be loaded and executed.

In certain embodiments, a virtual machine may run a network operating system (NOS) (also sometimes referred to as a network protocol stack) and be configured to perform processing related to forwarding of packets from network device 100. As part of this processing, the virtual machine may be configured to maintain and manage routing information that is used to determine how a data packet received by network device 100 is forwarded from network device 100. In certain implementations, the routing information may be stored in a routing database (not shown) stored by network device 100. The virtual machine may then use the routing information to program a packet processor 106, which then performs packet forwarding using the programmed information, as described below.

The virtual machine running the NOS may also be configured to perform processing related to managing sessions for various networking protocols being executed by network device 100. These sessions may then be used to send signaling packets (e.g., keep-alive packets) from network device 100. Sending keep-alive packets enables session availability information to be exchanged between two ends of a forwarding or routing protocol.

In certain implementations, redundant virtual machines running network operating systems may be provided to ensure high availability of the network device. In such implementations, one of the virtual machines may be configured to operate in an "active" mode (this virtual machine is referred to as the active virtual machine) and perform a set of functions while the other virtual machine is configured to operate in a "standby" mode (this virtual machine is referred to as the standby virtual machine) in which the set of functions performed by the active virtual machine are not performed. The standby virtual machine remains ready to take over the functions performed by the active virtual machine. Conceptually, the virtual machine operating in active mode is configured to perform a set of functions that are not performed by the virtual machine operating in standby mode. For example, the virtual machine operating in active mode may be configured to perform certain functions related to routing and forwarding of packets from network device 100, which are not performed by the virtual machine operating in standby mode. The active virtual machine also takes ownership of and manages the hardware resources of network device 100.

Certain events may cause the active virtual machine to stop operating in active mode and for the standby virtual machine to start operating in the active mode (i.e., become the active virtual machine) and take over performance of the set of functions related to network device 100 that are performed in active mode. The process of a standby virtual machine becoming the active virtual machine is referred to as a failover or switchover. As a result of the failover, the virtual machine that was previously operating in active mode prior to the failover may operate in the standby mode after the failover. A failover enables the set of functions performed in active mode to be continued to be performed without interruption. Redundant virtual machines used in this manner may reduce or even eliminate the downtime of network device 100's functionality, which may translate to higher availability of network device 100. The set of functions that are performed in active mode, and which are not performed by the active virtual machine and not performed by the standby virtual machine may differ from one network device to another.

Various different events may cause a failover to occur. Failovers may be voluntary or involuntary. A voluntary failover may be purposely caused by an administrator of the network device or network. For example, a network administrator may, for example, using a command line instruction, purposely cause a failover to occur. There are various situations when this may be performed. As one example, a voluntary failover may be performed when software for the active virtual machine is to be brought offline so that it can be upgraded. As another example, a network administrator may cause a failover to occur upon noticing performance degradation on the active virtual machine or upon noticing that software executed by the active computing domain is malfunctioning.

An involuntary failover typically occurs due to some critical failure in the active virtual machine. This may occur, for example, when some condition causes the active virtual machine to be rebooted or reset. This may happen, for example, due to a problem in the virtual machine kernel, critical failure of software executed by the active virtual machine, and the like. An involuntary failover causes the standby virtual machine to automatically become the active virtual machine.

In the example depicted in FIG. 1, VM-1 116 is shown as operating in active mode and VM-2 118 is shown as operating in standby mode. The active-standby model enhances the availability of network device 100 by enabling the network device to support various high-availability functionalities such as graceful restart, non-stop routing (NSR), and the like.

During normal operation of network device 100, there may be some messaging that takes place between the active virtual machine and the standby virtual machine. For example, the active virtual machine may use messaging to pass network state information to the standby virtual machine. The network state information may comprise information that enables the standby virtual machine to become the active virtual machine upon a failover or switchover in a non-disruptive manner. Various different schemes may be used for the messaging, including, but not restricted to, Ethernet-based messaging, Peripheral Component Interconnect (PCI)-based messaging, shared memory based messaging, and the like.

Hardware resources or devices 108 may include without restriction one or more field programmable gate arrays (FPGAs), application specific integrated circuits (ASICs), I/O devices, and the like. I/O devices may include devices such as Ethernet devices, PCI Express (PCIe) devices, and others. In certain implementations, some of hardware resources 108 may be partitioned between multiple virtual machines executed by network device 100 or, in some instances, may be shared by the virtual machines. One or more of hardware resources 108 may assist the active virtual machine in performing networking functions. For example, in certain implementations, one or more FPGAs may assist the active virtual machine in performing the set of functions performed in active mode.

As previously indicated, network device 100 may be configured to receive and forward packets to facilitate delivery of the packets to their intended destinations. The packets may include data packets and signal or protocol packets (e.g., keep-alive packets). The packets may be received and/or forwarded using one or more ports 107. Ports 107 represent the I/O plane for network device 100. A port within ports 107 may be classified as an input port or an output port depending upon whether network device 100 receives or transmits a packet using that port. A port over which a packet is received by network device 100 may be referred to as an input port. A port used for communicating or forwarding a packet from network device 100 may be referred to as an output port. A particular port may function both as an input port and an output port. A port may be connected by a link or interface to a neighboring network device or network. In some implementations, multiple ports of network device 100 may be logically grouped into one or more trunks.

Ports 107 may be capable of receiving and/or transmitting different types of network traffic at different speeds, such as speeds of 1 Gigabits per second (Gbps), 10 Gbps, 100 Gbps, or more. Various different configurations of ports 107 may be provided in different implementations of network device 100. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

In certain implementations, upon receiving a data packet via an input port, network device 100 is configured to determine an output port to be used for transmitting the data packet from network device 100 to facilitate communication of the packet to its intended destination. Within network device 100, the packet is forwarded from the input port to the determined output port and then transmitted or forwarded from network device 100 using the output port.

Various different components of network device 100 are configured to cooperatively perform processing for determining how a packet is to be forwarded from network device 100. In certain embodiments, packet processor 106 may be configured to perform processing to determine how a packet is to be forwarded from network device 100. In certain embodiments, packet processor 106 may be configured to perform packet classification, modification, forwarding and Quality of Service (QoS) functions. As previously indicated, packet processor 106 may be programmed to perform forwarding of data packets based upon routing information maintained by the active virtual machine. In certain embodiments, upon receiving a packet, packet processor 106 is configured to determine, based upon information extracted from the received packet (e.g., information extracted from a header of the received packet), an output port of network device 100 to be used for forwarding the packet from network device 100 such that delivery of the packet to its intended destination is facilitated. Packet processor 106 may then cause the packet to be forwarded within network device 100 from the input port to the determined output port. The packet may then be forwarded from network device 100 to the packet's next hop using the output port.

In certain instances, packet processor 106 may be unable to determine how to forward a received packet. Packet processor 106 may then forward the packet to the active virtual machine, which may then determine how the packet is to be forwarded. The active virtual machine may then program packet processor 106 for forwarding that packet. The packet may then be forwarded by packet processor 106.

In certain implementations, packet processing chips or merchant ASICs provided by various 3rd-party vendors may be used for packet processor 106 depicted in FIG. 1. For example, in some embodiments, Ethernet switching chips provided by Broadcom® or other vendors may be used. For example, in some embodiments, Qumran ASICs (may, for example, be used in a pizza-box implementation), or Jericho packet processor chips (BCM88670) (may, for example, be used in a chassis-based system), or other ASICs provided by Broadcom® may be used as packet processor 106. In alternative implementations, chips from other vendors may be used as packet processor 106.

FIG. 2 is a simplified block diagram of yet another example network device 200. Network device 200 depicted in FIG. 2 is commonly referred to as a chassis-based system (network device 100 depicted in FIG. 1 is sometimes referred to as a "pizza-box" system). Network device 200 may be configured to receive and forward packets, which may be data packets or signaling or protocol-related packets (e.g., keep-alive packets). Network device 200 comprises a chassis that includes multiple slots, where a card or blade or module can be inserted into each slot. This modular design allows for flexible configurations, with different combinations of cards in the various slots of the network device for supporting differing network topologies, switching needs, and performance requirements.

In the example depicted in FIG. 2, network device 200 comprises multiple line cards (including first line card 202 and a second line card 204), two management cards/modules 206, 208, and one or more switch fabric modules (SFMs) 210. A backplane 212 is provided that enables the various cards/modules to communicate with each other. In certain embodiments, the cards may be hot swappable, meaning they can be inserted and/or removed while network device 200 is powered on. In certain implementations, network device 200 may be a router or a switch such as various routers and switches provided by Brocade Communications Systems, Inc. of San Jose, Calif.

Network device 200 depicted in FIG. 2 is merely an example and is not intended to unduly limit the scope of inventive embodiments recited in the claims. One of ordinary skill in the art would recognize many variations, alternatives, and modifications. For example, in some embodiments, network device 200 may have more or fewer components than shown in FIG. 2, may combine two or more components, or may have a different configuration or arrangement of components.

In the example depicted in FIG. 2, network device 200 comprises two redundant management modules 206, 208. The redundancy enables the management modules to operate according to the active-standby model, where one of the management modules is configured to operate in standby mode (referred to as the standby management module) while the other operates in active mode (referred to as the active management module). The active management module may be configured to perform management and control functions for network device 200 and may represent the management plane for network device 200. The active management module may be configured to execute applications for performing management functions such as maintaining routing tables, programming the line cards (e.g., downloading information to a line card that enables the line card to perform data forwarding functions), and the like. In certain embodiments, both the management modules and the line cards act as a control plane that programs and makes programming decisions for packet processors in a network device. In a chassis-based system, a management module may be configured as a coordinator of multiple control planes on the line cards.

When a failover or switchover occurs, the standby management module may become the active management module and take over performance of the set of functions performed by a management module in active mode. The management module that was previously operating in active mode may then become the standby management module. The active-standby model in the management plane enhances the availability of network device 200, allowing the network device to support various high-availability functionality such as graceful restart, non-stop routing (NSR), and the like.

In the example depicted in FIG. 2, management module 206 is shown as operating in active mode and management module 208 is shown as operating in standby mode. Management modules 206 and 208 are communicatively coupled to the line cards and switch fabric modules (SFMs) 210 via backplane 212. Each management module may comprise one or more processors, which could be single or multicore processors and associated system memory. The processors may be general purpose microprocessors such as ones provided by Intel®, AMD®, ARM®, Freescale Semiconductor, Inc., and the like, which operate under the control of software stored in associated memory.

A switch fabric module (SFM) 210 may be configured to facilitate communications between the management modules 206, 208 and the line cards of network device 200. There can be one or more SFMs in network device 200. Each SFM 210 may include one or more fabric elements (FEs) 218. The fabric elements provide an SFM the ability to forward data from an input to the SFM to an output of the SFM. An SFM may facilitate and enable communications between any two modules/cards connected to backplane 212. For example, if data is to be communicated from one line card 202 to another line card 206 of network device 200, the data may be sent from the first line card to SFM 210, which then causes the data to be communicated to the second line card using backplane 212. Likewise, communications between management modules 206, 208 and the line cards of network device 200 are facilitated using SFMs 210.

In the example depicted in FIG. 2, network device 200 comprises multiple line cards including line cards 202 and 204. Each line card may comprise a set of ports (214 and/or 216) that may be used for receiving and forwarding packets. The ports of a line card may be capable of receiving and/or transmitting different types of network traffic at different speeds, such as speeds of 1 Gbps, 10 Gbps, 100 Gbps, or more. Various different configurations of line cards ports may be provided in network device 200. For example, configurations may include 72 10 Gbps ports, 60 40 Gbps ports, 36 100 Gbps ports, 24 25 Gbps ports+10 48 Gbps ports, 12 40 Gbps ports+10 48 Gbps ports, 12 50 Gbps ports+10 48 Gbps ports, 6 100 Gbps ports+10 48 Gbps ports, and various other combinations.

Each line card may include one or more single or multi-core processors, a system memory, a packet processor, and one or more hardware resources. In certain implementations, the components on a line card may be configured similar to the components of network device 100 depicted in FIG. 1 (components collectively represented by reference 150 from FIG. 1 and also shown in line cards 202, 204 in FIG. 2).

A packet may be received by network device 200 via a port on a particular line card. The port receiving the packet may be referred to as the input port and the line card as the source/input line card. The packet processor on the input line card may then determine, based upon information extracted from the received packet, an output port to be used for forwarding the received packet from network device 200. The output port may be on the same input line card or on a different line card. If the output port is on the same line card, the packet is forwarded by the packet processor on the input line card from the input port to the output port and then forwarded from network device 200 using the output port. If the output port is on a different line card, then the packet is forwarded from the input line card to the line card containing the output port using backplane 212. The packet is then forwarded from network device 200 by the packet processor on the output line card using the output port.

In certain instances, the packet processor on the input line card may be unable to determine how to forward a received packet. The packet processor may then forward the packet to the active virtual machine on the line card, which then determines how the packet is to be forwarded. The active virtual machine may then program the packet processor on the line card for forwarding that packet. The packet may then be forwarded to the output port (which may be on input line card or some other line card) then by that packet processor and then forwarded from network device 200 via the output port.

In certain instances, the active virtual machine on an input line card may be unable to determine how to forward a received packet. The packet may then be forwarded to the active management module, which then determines how the packet is to be forwarded. The active management module may then communicate the forwarding information from the line cards, which may then program their respective packet processors based upon the information. The packet may then be forwarded to the line card containing the output port (which may be on input line card or some other line card) and then forwarded from network device 200 via the output port.

In certain instances, the active virtual machine on an input line card may be unable to determine how to forward a received packet. The packet may then be forwarded to the active management module, which then determines how the packet is to be forwarded. The active management module may then communicate the forwarding information from the line cards, which may then program their respective packet processors based upon the information. The packet may then be forwarded to the line card containing the output port (which may be on the input line card or some other line card) and then forwarded from network device 200 via the output port.

Figure 3:
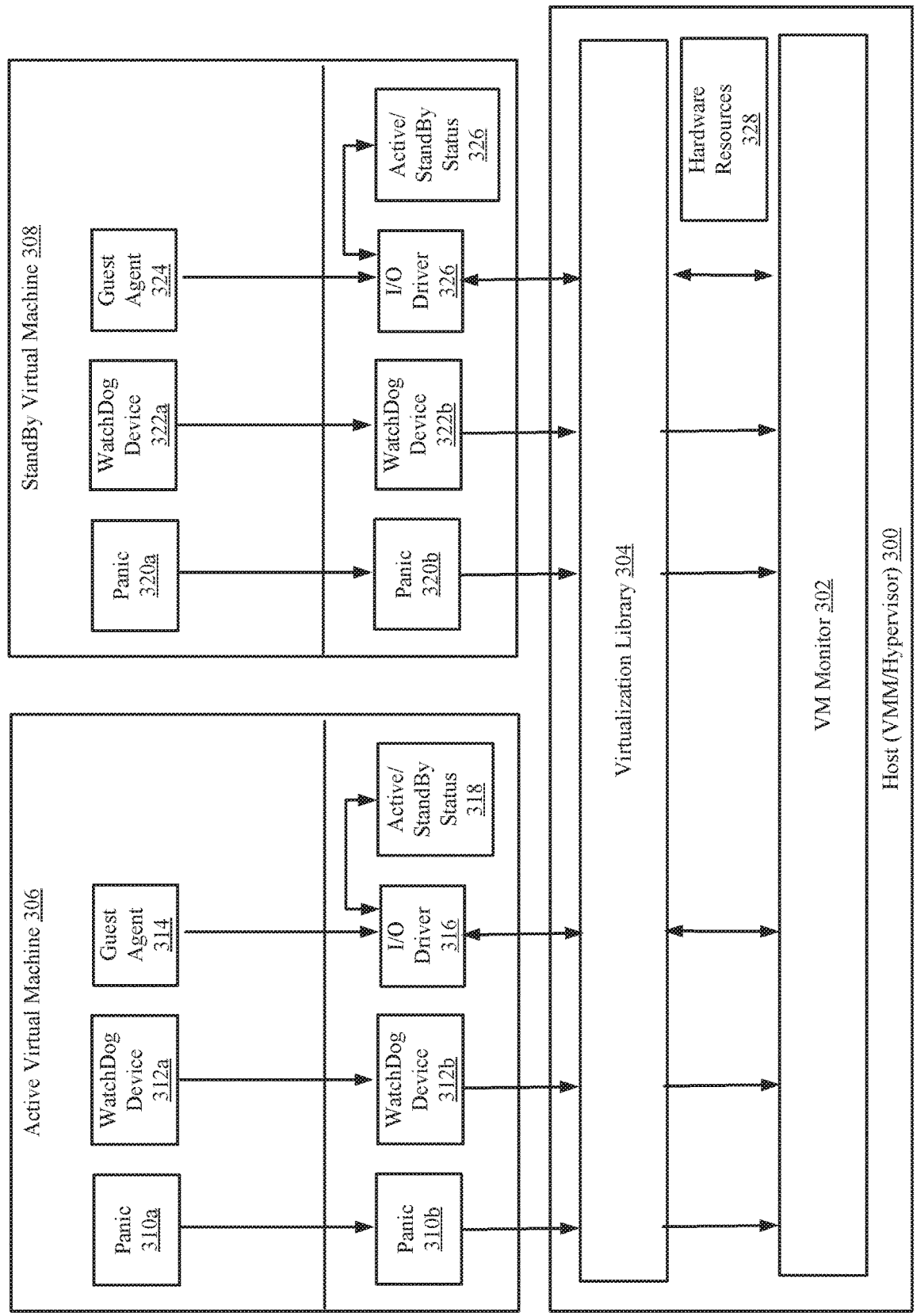
FIG. 3 is an example block diagram for illustrating a high availability system, according to certain aspects of the disclosure.

FIG. 3 is an example block diagram for illustrating a high availability system, according to certain aspects of the disclosure. In certain embodiments, the system may be a network device. FIG. 3 illustrates a host device and two virtual machines (i.e., guests) hosted by the host device. The host represents a device executing host software 300. The host software 300 may include a hypervisor (also referred to as a virtual machine monitor) for hosting virtual machines. In certain embodiments, the host software 300 may be referred to a hypervisor and/or virtual machine monitor. One virtual machine is an active virtual machine 306, whereas the other virtual machine is a standby virtual machine 308. In certain embodiments, the active virtual machine 306 facilitates processing and/or forwarding of network packets from the network device to another network device. The standby virtual machine 308, while in standby, is configured to operate with minimal resources and does not forward network packets. The standby virtual machine 308 is switched to active in the event that the active virtual machine 306 can no longer process and forward network packets. The host device, the active virtual machine 306 (or active guest), the standby virtual machine 308 (or standby guest), the hypervisor 300, the VM monitor 302 and other aspects disclosed with respect to FIG. 3 may be implemented using one or more components or devices disclosed and discussed with reference to FIG. 1 and FIG. 2 above.

Generally, no robust techniques exist for switching active-standby virtual machines (i.e., guests) upon a catastrophic event in the active virtual machine 306. This results in poor responsiveness of the network device. For example, the network device may start dropping network packets due to its inability to continue to service (e.g., process/forward) network packets, since switching the standby virtual machine 308 to active virtual machine may take a considerable amount of time, unacceptable in a high availability environment.

In certain embodiments, the host may include a virtualization library for facilitating management of the virtual machines and a VM Monitor for monitoring the status of the virtual machines, and switching the standby virtual machine 308 to active virtual machine upon determining/detecting a catastrophic event in the active virtual machine 306.

In certain implementations, the active virtual machine 306 may be configured to indicate to the VM Monitor 302 via the virtualization library 304 the status of the active virtual machine 306. For example, the active virtual machine 306 user space and kernel space may execute processes (e.g., panic modules 310a, 310b) for monitoring and reporting the health of the virtual machine. The virtualization library may provide a virtualized panic module (not shown) or virtualized resource. In certain embodiments, the VM Monitor 302 monitors the virtualized panic module in the virtualization library. For example, if a network processing application aborts or if a kernel module becomes non-responsive, the panic modules may provide an indication to the virtualized panic module in the virtualization library 304, resulting in a change in the status of the virtualized panic module in the virtualization library 304. The VM Monitor 302 may monitor the virtualized panic module in the virtualization library for such conditions and/or change of status of the virtualized panic module. The standby virtual machine 308 may also have panic modules (320a and 320b) that may be inactive (or in some instances not initialized) while the virtual machine is in standby mode.

Furthermore, watchdog timers (312a, 312b) may be implemented for monitoring the health of the system. In certain embodiments, a software (312a) and emulated hardware in the guest operating system (312b) pairing may be used in the virtual machine for reporting non-responsiveness of a virtual machine to a virtualized watchdog timer (not shown) in the VM Monitor 304. For example, the software watchdog 312a may periodically test accessibility of certain resources, such as file systems, disks, memory, I/O devices, etc., to determine responsiveness of the system. In the event that the software watchdog cannot access resources that are expected to be accessible, the software watchdog 312a may indicate to the emulated hardware watchdog in guest operating system 312b and the virtualized watchdog timer (not shown) in the virtualization library 304 that portions of the system are non-responsive. In turn, the VM Monitor 302 may monitor the virtualized watchdog timer for detecting indications of the non-responsiveness of the system. The standby virtual machine 308 may also have watchdog timers (322a and 322b) that may be inactive (or in some instances not initialized) while the virtual machine is in standby mode.

In certain other embodiments, an agent 314 for the virtual machine or a virtual machine agent 314 may be executed in the virtual machine for providing continuous pings/alerts to the VM Monitor through a low bandwidth, but highly reliable emulated input/output device 316. The virtualized I/O device resource (not shown) may be implemented in the host software that reflects changes to the emulated I/O device 316 in the active virtual machine 306. The VM monitor 302 may monitor the virtualized I/O device in the host software and if the virtualized I/O device in the host software does not observe a ping for a pre-determined amount of time, the VM Monitor 302 may assume that the active virtual machine 302 has become non-responsive and corrective, diagnostic, switchover, or other actions may be needed by the VM Monitor 302. The standby virtual machine 308 may also have an agent 324 and an emulated I/O device 326 that may be inactive (or in some instances not initialized) while the virtual machine is in standby mode.

The virtual machines may also keep an indicator of their own active/standby status (318, 326) and may either periodically, on-demand or with an event, provide the virtual machines active/standby status to the VM Monitor 302 through the I/O driver interface.

The VM Monitor 302 in some instances may either aggregate or act independently on each of the events received from the active virtual machine 306. In the event that the VM Monitor 302 determines that the active virtual machine 306 may no longer be able to perform operations expected of the active virtual machine 306, such as process network packets, the VM Monitor 302 may instigate the process of switching the standby virtual machine 308 to the active virtual machine (i.e., switchover/failover).

In certain embodiments, the VM Monitor 302 may start switching the standby virtual machine 308 to the active virtual machine by setting an indicator in the standby virtual machine 308 through the I/O driver interface coupled to the virtualization library 304. In certain instances, the VM Monitor 302 may switch the hardware resources 328 connected to the active virtual machine 306 to the standby virtual machine 308, so that the standby virtual machine 308 can have access to the hardware resources 328 once the standby virtual machine 308 switches to active mode. Hardware resources 328 may include, but are not limited to, networking resources and/or access to the display console.

Figure 4:
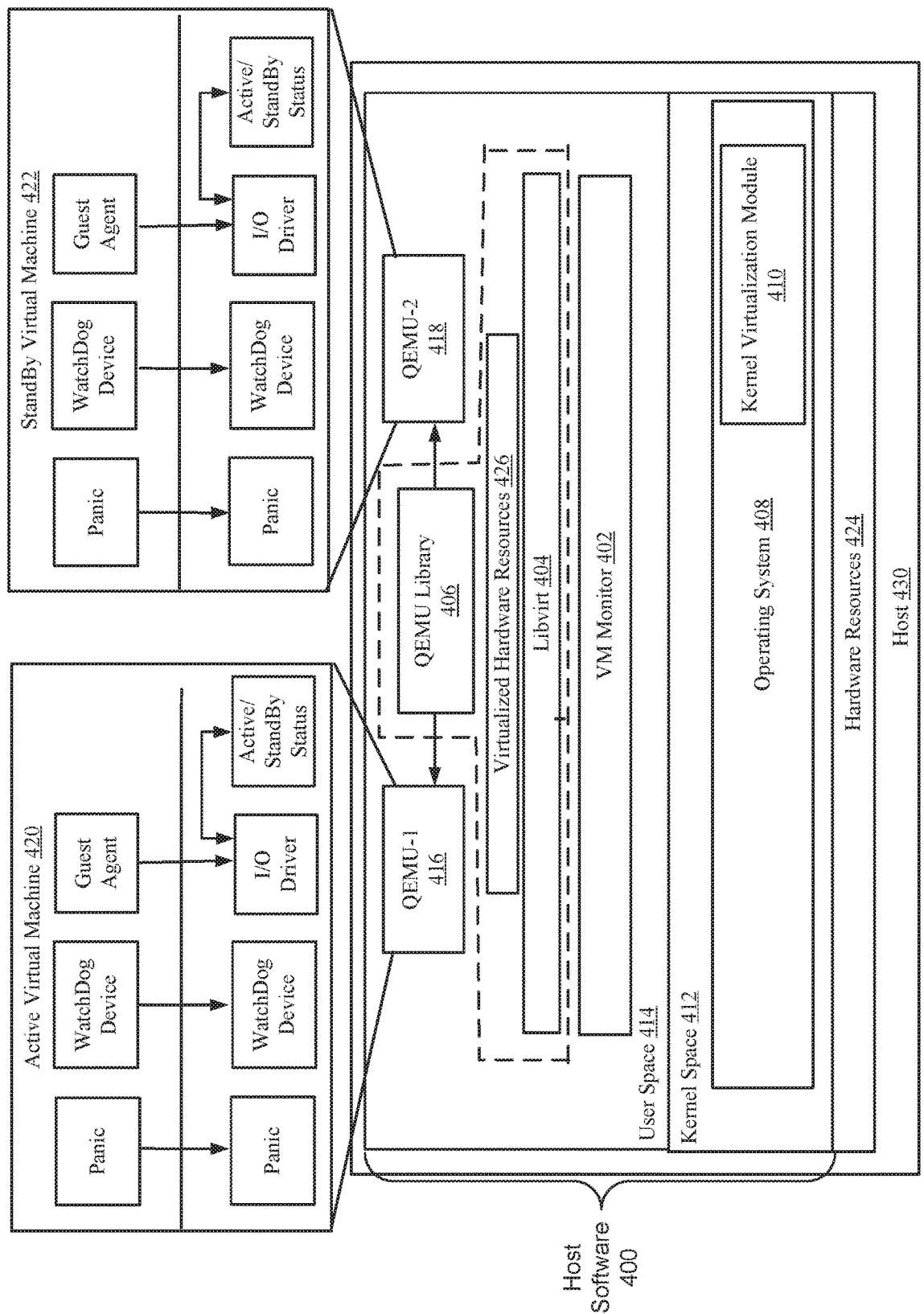
FIG. 4 illustrates a more detailed, but non-limiting, view of the system disclosed in FIG. 3.

FIG. 4 illustrates a more detailed, but non-limiting view of the system disclosed in FIG. 3. FIG. 4 is an example block diagram for illustrating a high availability system, according to certain aspects of the disclosure. In certain embodiments, the system disclosed in FIG. 4 may be a network device. FIG. 4 illustrates a host device 430 and two virtual machines (i.e., guests) hosted by the host device 430. The system disclosed in FIG. 4 may be referred to as a hosted guest system or a type 2 hypervisor system. The host 430 represents a device executing host software 400.

The host software 400 may execute from memory and include software executing from kernel space 412 and user space 414. In certain embodiments, a software thread executing from user space 414 may also be referred to as a thread that executes instructions in user mode with user mode privileges. In certain embodiments, instructions executing in user mode may have less privileges as compared to instructions executing in kernel mode. For example, instructions associated with a process executing in user mode may have restrictions on access to portions of the hardware (e.g., memory, processor registers, peripheral devices, etc.). Furthermore, in certain embodiments, instructions associated with a process executing in user mode may not be trusted to interact with the system or other entities, processes, threads, agents, or users executing on the same system in a manner that is inconsistent with the integrity and security of such other actors in the system. Furthermore, in certain implementations, threads/drivers/processes executing from kernel space 412, such as drivers, kernel modules, may have higher privileges to resources, such as hardware resources than the agents execute in user space. In certain embodiments, instructions executing from kernel space 304 may also be referred to as instructions in kernel mode with kernel mode privileges. In certain embodiments, instructions executing in kernel mode may have more privileges as compared to instructions executing in user mode. For example, instructions associated with a process executing in kernel mode may have access to portions of the hardware (e.g., memory, processor registers, peripheral devices, etc.) that are not accessible to instructions executing in user mode. For example, a kernel module executing from the kernel space 412 may have access to privileged instructions associated with accessing certain virtualization extensions associated with the processor. Furthermore, in certain embodiments, instructions associated with a process executing in kernel mode may be trusted to modify configuration of the system and information associated with other processes (e.g., paging structures) running on the system.

The kernel space 412 of the host software 400 may include an operating system 408 operating in kernel mode. The operating system 408 performs the systems basic functions, such as managing memory, input-output devices, scheduling of execution (of tasks/threads/processes) on the processor and controlling peripherals and hardware resources. Examples of operating systems may include, but are not limited to, versions and variations of MacOS®, Microsoft Windows®, Unix and Linux.

In certain embodiments, the host software 400 loads a kernel module in the operating system 408 for supporting virtualization using the virtualization extensions of the processor. The Kernel module may be a separately compiled loadable kernel module (or LKM) that is an object file that contains code to extend the running kernel, or so-called base kernel, of an operating system. LKMs are typically used to add support for new hardware (as device drivers) and/or filesystems, or for adding system calls. The kernel virtualization module 410 from FIG. 4 may be one such loadable kernel module that is a Kernel-based Virtual Machine (KVM). KVM 410 is a virtualization infrastructure for the Linux kernel that turns Linux kernel into a hypervisor. KVM 410 functions by utilizing virtualization extensions on processors. Using a kernel module loaded into memory, KVM 410 utilizes the processor and, via user mode driver based on QEMU library 406, KVM 410 emulates a hardware layer upon which virtual machines can be created and executed.

The user space 414 may include several software components that enable initiation, initialization, management, and monitoring of the virtual machines, such as Libvirt 404, Qemu library 406 and the VM Monitor 402. The Libvirt 404 and Qemu library 406 together may be similar to the virtualization library 304 of FIG. 3. The VM Monitor 402 may be similar in certain aspects to the VM Monitor 302 of FIG. 3.

LibVirt 404 and Qemu library 406 may be used together to initiate, initialize and manage virtual machines. The LibVirt 404 manages virtual machines for the host. LibVirt is used as a management layer between the host device 430 and the virtual machines for managing operations associated with the virtual machines. LibVirt also provides a toolset for managing virtualization functions, such as starting, stopping, and managing guests. In certain embodiments, LibVirt may provide application programmable interfaces (APIs) into the Qemu (Quick Emulator).

LibVirt 404 calls the Qemu Library 406, which in turn initiates a Qemu process (416, 418). The Qemu process is initiated with memory and physical resources. The Qemu process initiates the virtual machine and spawns a (posix) thread. The thread calls the KVM 410 kernel module to switch to VM (i.e. guest) mode and proceeds to execute the code. On execution of a privileged instruction by the Qemu thread, the Qemu thread switches back to the KVM 410, which may again signal the Qemu thread to handle most of the hardware emulation. Multiple threads within the same virtual machine may be initiated by the Qemu process and each of these threads may be referred to as virtual CPUs or VCPUs. Each of these threads may be managed by the operating system 408 scheduler. If the underlying platform has multiple processor cores available, in certain embodiments, the VCPUs may be pinned (using thread affinity) to each of the physical processor cores. Qemu can also emulate resources that the processor/kernel does not virtualize. For example, the Qemu can emulate the networking interface card (NIC) interfaces, disk, display and user interaction ports (e.g., USB, or serial/parallel ports). LibVirt 404 individually or in combination with Qemu may also virtualize resources for the virtual machines for interacting with the PVPanic, I6300esb watchdog and the VirtIO-serial.

Using the above described techniques, the host software 400 initializes the Qemu process 416 that instantiates the active virtual machine 420. In certain embodiments, the active virtual machine 420 facilitates processing and/or forwarding of network packets from the network device to another network device. The host software 400 also initializes the Qemu process 418 that instantiates the standby virtual machine 422. The standby virtual machine 422, while in standby, is configured to operate with minimal resources and does not forward network packets. The standby virtual machine 422 is switched to active in the event that the active virtual machine 420 can no longer process and forward network packets.

Generally, no robust techniques exist for switching active-standby virtual machines (i.e., guests) upon a catastrophic event in the active virtual machine 420 in a hosted virtual machine environment, as disclosed with respect to FIG. 4. This results in poor responsiveness of the network device in such systems. For example, the network device may start dropping network packets due to its inability to continue to service (e.g., process/forward) network packets, since switching the standby virtual machine 422 to active virtual machine may take a considerable amount of time, unacceptable in a high availability environment.

As discussed previously, the LibVirt 404 and the Qemu processes (416, 418) may each individually or in combination with each other emulate and virtualize several hardware resources. Virtualizing a hardware resource for a virtual machine may include providing an interface to the virtual machine, such that instructions executing in the virtual machine perceive that they are directly interacting with the underlying hardware that is being virtualized. The virtualization of the hardware resource may also include calling kernel functions to facilitate the interaction with the underlying hardware or in some instances handling the stimulus from the virtual machine in software itself without any further interactions with the hardware. Yet in other embodiments, virtualization of the resource may include performing certain operations (such as translations of addresses, modifications of packets, handling of exceptions) before initiating interaction with the underlying hardware.

In certain embodiments, the VM Monitor 402 monitors the status of the active virtual machine 420 by monitoring the virtualized hardware resources of the active virtual machine 420 and switching the standby virtual machine 422 to active virtual machine upon determining/detecting a catastrophic event in the active virtual machine 420 based on change in state of the virtualized hardware resources associated with the active virtual machine 420.

As disclosed with respect to FIG. 3, the active virtual machine 420 may include panic modules for monitoring and reporting the health of the virtual machine. For example, if a network processing application aborts or if a kernel module becomes non-responsive, the panic modules may provide an indication to a virtualized panic module of the virtualized hardware resources 426, resulting in change in the status of the virtualized panic module. Similarly, watchdog timers may be implemented for monitoring the health of the system. For example, the watchdog timers may periodically test accessibility of certain resources, such as file systems, disks, memory, I/O devices, etc. to determine responsiveness of the system. In the event that the software watchdog cannot access resources that are expected to be accessible, the software watchdog may indicate to the virtualized hardware watchdog timer in the virtualized hardware resources 426 that portions of the system are non-responsive. Furthermore, the virtual machine may include agents for communicating the status of the virtual machine through continuous pings/alerts to the virtualized hardware resources 426 through a low bandwidth, but highly reliable emulated input/output device.

In certain embodiments, the VM Monitor 402 monitors the change in state of the virtualized hardware resources 426 associated with the active virtual machine 420, such as the virtualized panic modules, virtualized watchdog timers, and pings/alerts from agents executing in the active virtual machine 420. The virtual machines may also keep an indicator of their own active/standby status and may either periodically, on-demand or with an event, provide the virtual machines active/standby status to the VM Monitor 402 through the I/O driver interface.

The LibVirt 404 and the Qemu processes may individually or in combination with each other provide such virtualized hardware resources 426, enabling the VM Monitor 402 to monitor the status/behavior of an emulated/virtualized device instead of mere events from the virtual machines. Monitoring such virtualized hardware resources 426 that are associated with traditional operating system health monitoring techniques, such as panic modules and watchdog timers, rather than just events originating from the virtual machine provides for more robust and earlier signs of decay in the health of the virtual machine, rather than a catastrophic shutdown event from a virtual machine.

Upon determining/detecting a catastrophic event in the active virtual machine 420 based on a change in state of these virtualized hardware resources associated with the active virtual machine 420, the VM Monitor 402 determines that the active virtual machine 420 may no longer be able to perform operations expected of the active virtual machine 420, such as process network packets. In such instances, the VM Monitor 402 may instigate the process of switching the standby virtual machine 422 to the active virtual machine (i.e., switchover/failover).

In certain embodiments, the VM Monitor 402 may start switching the standby virtual machine 422 to the active virtual machine by setting an indicator in the standby virtual machine 422 through the I/O driver interface coupled to the VM Monitor 402. In certain instances, the VM Monitor 402 may switch portions of the hardware resources 424 connected to the active virtual machine 420 to the standby virtual machine 422, so that the standby virtual machine 422 can have access to the hardware resources 424 once the standby virtual machine 422 switches to active mode. Hardware resources 424 may include, but are not limited to, networking resources and/or access to the display console.

Figure 5:
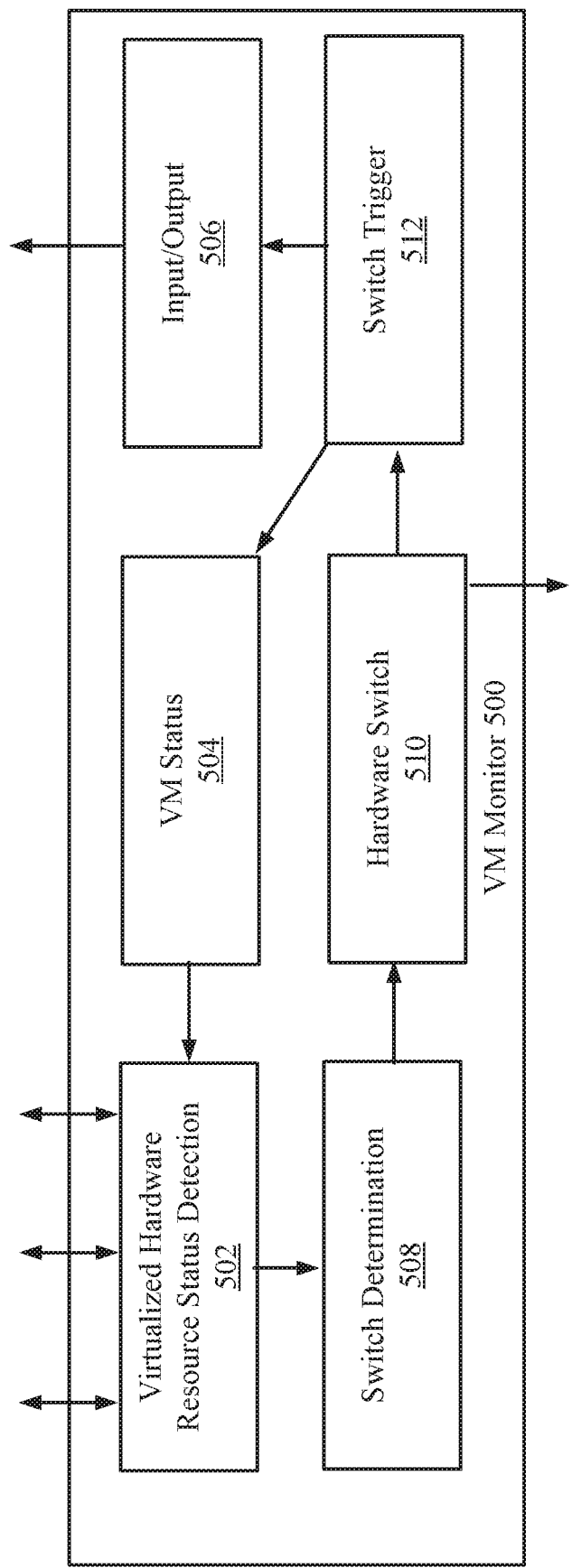
FIG. 5 illustrates a more detailed, but non-limiting, view of an example implementation of the VM Monitor, disclosed in FIG. 3 and FIG. 4.

FIG. 5 illustrates a more detailed, but non-limiting, view of an example implementation of the VM Monitor, disclosed in FIG. 3 and FIG. 4. The VM Monitor 500 may be implemented using instructions stored on a non-transitory computer readable medium. In certain embodiments, the VM Monitor 500 may maintain the status of each of the executing VM's or guests on the device, such as their active-standby status. It should be noted, that even though FIG. 3 and FIG. 4 only disclose two virtual machines, several virtual machines may be supported and may concurrently operate on the device. Furthermore, in certain configurations, multiple standby virtual machines may be provided.

In certain embodiments, the VM Monitor 500 has a virtualized hardware resources status detection module 502 comprising logic for detecting the change in the status of the one or more virtualized hardware resources discussed in FIG. 3 and/or FIG. 4. For example, the virtualized hardware resource status detection module 502 may monitor the virtualized panic module, virtualized watchdog timer and/or the virtualized I/O device for ping/alerts from the active virtual machine.

The switch determination module 508 based on the detected change in the status by the virtualized hardware resources status detection module 502 may determine whether to switch the standby virtual machine to the active virtual machine. In some embodiments, the switch determination module 502 may be configurable to allow variability. For example, the switch determination module 502 may be configured to allow a lapse in ping events for a predetermined and/or configured time period before determining that the active virtual machine is non-responsive and a switchover of the standby virtual machine to the active virtual machine is needed.

In certain embodiments, once the switch determination module 508 has determined that the standby virtual machine should be switched to the active virtual machine, the hardware switch module 510 may take the hardware resources that are currently assigned to the active virtual machine and switch such resources to the standby virtual machine. Switching physical/hardware resources assigned to one virtual machine to another may entail disconnecting the physical resources (e.g., ports, addresses, interfaces) for the physical/hardware devices from the virtual ports, virtual addresses and/or virtual interfaces for the guest/VM and reconnecting such physical resources to the virtual ports, virtual addresses and/or virtual interfaces of the soon to be active virtual machine. Examples of such devices may include, but are not limited to, networking resources and/or display consoles.

Once the hardware resources are switched to the standby virtual machine, the switch trigger module 512 of the VM Monitor 500 may switch the standby virtual machine to the active virtual machine. The switch trigger module 512 may update the status of the VM/guest in the VM status module 504 and also trigger the input/output module 506 to communicate with the switch trigger module 512 to switch the standby virtual machine to the active virtual machine. In one implementation, this communication may be facilitated through a low bandwidth but reliable communication channel between the host software and the virtual machines.

Although, embodiments discussed above describe a standby virtual machine (or guest), aspects of the disclosure are not limited to such an embodiment. For example, in certain implementations, a single virtual machine may be supported and the VM Monitor may reboot the virtual machine experiencing the catastrophic event and/or notify the network device operator of the catastrophic event being experienced by the network device.

Figure 6:
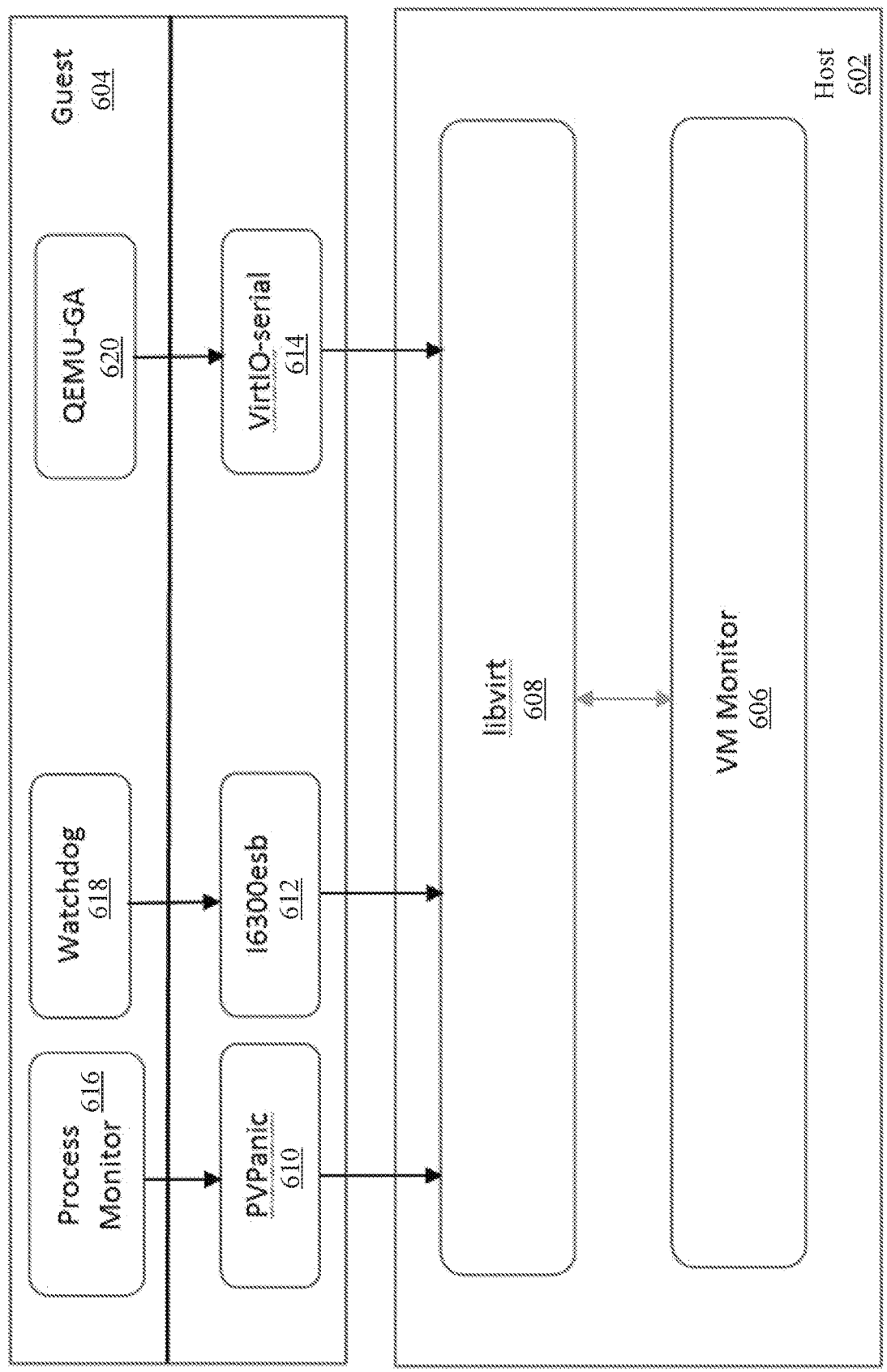
FIG. 6 is an example block diagram for illustrating another high availability system, according to certain aspects of the disclosure.

FIG. 6 is an example block diagram for illustrating another high availability system, according to certain aspects of the disclosure. FIG. 6 illustrates a host 602 and a single guest 604 (also previously referred to as a virtual machine). The host 602 represents a device executing a hypervisor for hosting multiple guests. Although, only one guest is shown in FIG. 6, several guests may be executing at the same time.

In certain embodiments, FIG. 6 depicts a high availability system with only an active guest 604, or an active guest 604 and a standby guest (not shown). The active guest 604 is responsible for processing and forwarding of network packets, whereas the standby guest is configured such that the standby guest can switch to being the active guest and resume operations close to where the active guest left off, in the event that the active guest 604 can no longer act as the active guest. For example, the active guest 604 may experience a catastrophic event that requires a reboot of the active guest. In such instances, the standby guest switches to active mode and starts processing the network packets.

As illustrated in FIG. 6, the host may execute LibVirt 608 and a VM Monitor module (also referred to as monitor) 606. The LibVirt 608 manages the guests for the hosts. LibVirt 608 is used as a management layer between the host device and the guests for managing operations associated with the guests. In certain embodiments, LibVirt 608 may provide application programmable interfaces (APIs) into the Qemu (Quick Emulator). LibVirt 608 also provides a toolset for managing virtualization functions, such as starting, stopping, and managing guests. For example, LibVirt 608 provides interfaces for interacting with the PVPanic 610, I6300esb watchdog 612 and the VirtIO-serial 614 (described in more detail below). In certain instances, host 602 and host device may be used interchangeably herein without deviating from the scope of the invention.

The host 602 may have a hardware supported virtualized environment using a Kernel-based virtual machine (KVM) and/or Quick Emulator (Qemu). For example, KVM may allow virtualization of name spaces and virtualization of resources supported by the processor virtualization. On the other hand, Qemu can also emulate resources that the processor/kernel does not virtualize. For example, the Qemu emulates the networking interface card (NIC) interfaces.

According to certain embodiments, upon detecting a catastrophic event from an active guest 604, the VM Monitor 606 alerts or indicates the standby guest to switch to active mode and start processing and forwarding packets.

PVPanic 610 is a simulated device that monitors processes (block 616), through which a guest panic event is sent to LibVirt 608 (through QEMU). PVPanic 610 can indicate catastrophic or near catastrophic events in the kernel (aka, Kernel Panic) of the guest 604 and/or also monitor processes (via Process Monitor), such as applications in the user space for the guest and alert LibVirt 608 regarding failing applications in the guest 604. PVPanic 610 allows management apps (e.g. LibVirt) to be notified and respond to the PVPanic. In certain instances, the PVPanic feature is enabled in the guest operating system and the LibVirt 608 as a configuration. According to aspects disclosed herein, the LibVirt 608 may be further configured to notify or interact with the VM Monitor 606 of any catastrophic events from the active guest 604.

The guest 604 may also execute a software watchdog 618 that alerts the watchdog device (e.g., Intel I6300esb) if portions of the guest system are non-responsive, such as a file system. In the virtualized guest, instead of the physical watchdog device, the QEMU emulates the Intel I6300esb 612 and provides a driver in the guest OS. The software watchdog periodically "tickles" the emulated I6300esb device 612. If the emulated I6300esb 612 does not receive a "tickle" or an indicator that the system is responsive for a pre-determined period of time, the emulated I6300esb may assume that the system is non-responsive and alerts the LibVirt of the non-responsiveness of the guest. In turn, again the LibVirt 608 notifies the VM Monitor 606 of the non-responsiveness of the current active guest 604.

The active guest 604 may also include a QEMU_GA 620 (QEMU_guest Agent). The QEMU guest agent 620 may periodically respond to a ping sent by the VM Monitor 606 with a ping response through the VirtIO-serial interface 614 and the LibVirt 608. VirtIO-serial interface 614 is a low bandwidth, but reliable interface between the guest 604 and the host 602. In some instances the VirtIO-serial interface 614 can transmit characters, similar to a TTY interface. If the VM Monitor 606 does not receive one or multiple ping responses, the VM Monitor 606 can initiate the switchover/failover process.

Upon receiving notification from the PVPanic 610, I6300esb 612 or the VirtIO-Serial 614, the VM Monitor 606 may determine to alert or indicate to the standby guest to switch to active in response to or in anticipation that the current active guest will not be able to continue to service/process network packets. The VM Monitor 606 may also instigate the reboot of the current active guest, take its hardware resources and assign them to the soon to be active guest. Once the failed or failing guest is rebooted, it may reboot as a standby guest.

Figure 7:
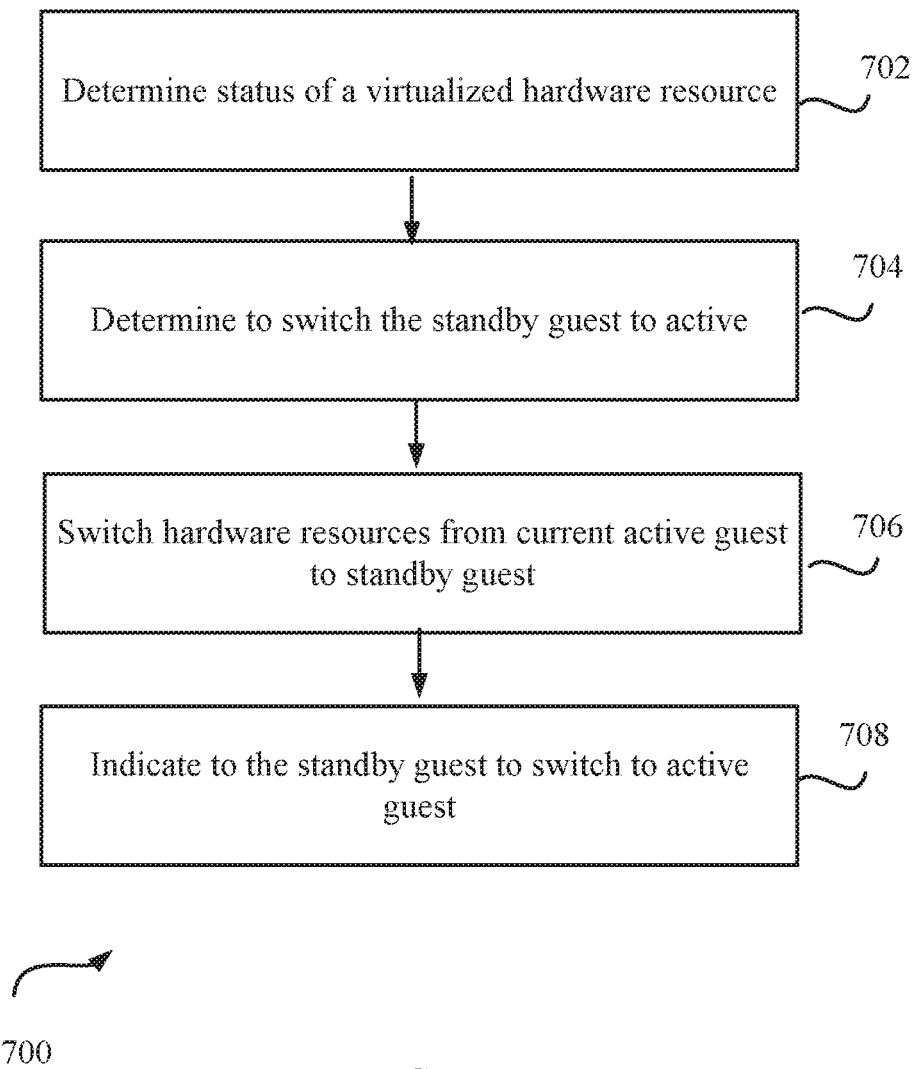
FIG. 7 is an example flow diagram for providing high availability, according to certain aspects of the disclosure.

FIG. 7 is an example flow diagram 700 for providing high availability, according to certain aspects of the disclosure. Steps disclosed herein may be performed by hardware, software, or any combination thereof and may be facilitated by components, modules, and techniques disclosed in FIGS. 1-6.

At step 702, components of the host, such as the VM Monitor, may monitor virtualized hardware resources of the host, wherein the virtualized hardware resources represent or indicate the health of the current active guest. For example, the virtualized panic module of the host may receive a panic event that indicates that either the kernel or an application running in the active guest is experiencing a catastrophic event and may not be able to continue to perform functions of an active guest.

At step 704, components of the host may determine based on the status of the virtualized hardware resource for the active guest, if a switchover is needed, wherein a switchover switches the current standby guest to active mode and the current active guest to standby after a reboot.

At step 706, components of the host take the hardware resources from the current active guest and provide them to the current standby guest, such that the hardware resources are available for the soon to be active guest as soon as the switchover happens. Examples of such hardware resources are networking resources and/or a display console.

At step 708, components of the host may indicate to the standby guest to switch to active mode by setting a status bit in the standby guest. Components of the host may communicate with the standby guest via a low bandwidth, but reliable, interface for changing the status of the guest from standby to active.

Steps and techniques described with respect to FIG. 7, in certain embodiments, may be implemented sequentially and/or concurrently with or without additional steps between them. Furthermore, certain steps may be performed out of order without deviating from the scope of the invention.

Certain systems provide hardware level redundancy for the management card using dual management modules—one active and the other standby. In current systems, there is no such hardware level redundancy for the line card modules.

In certain embodiments, the networking software is hosted in a virtualized environment. Two virtual machines are instantiated in the line card module to be able to provide control plane redundancy and in service software upgrade within the confines of a non-redundant hardware environment. An active and Standby relationship exists between these two Kernel Virtual Machine (KVM) guests to manage the underlying non-redundant hardware components—a notion that is not supported by KVM eco-system. Aspects of the disclosure provide, a virtual machine management and monitoring platform to support active and standby virtual machines that are completely transparent to the networking software hosted in the virtual machines. The monitoring platform provides fast failure indication for certain critical failure modes—less than 50 ms for kernel panic, and tunable 1 to 3 sec watchdog failure. This is an improvement from the 10 second heart-beat failure mechanism currently in place.

One of the components of the virtual machine management and monitoring platform is the VM Monitor process. In certain embodiments, this runs in the line card host environment and combines a number of KVM eco-system failure detection mechanisms, namely Para-virtual Panic (PV-Panic), Emulated Intel i6300esb hardware watchdog mechanism and QEMU Guest Agent (QEMU-GA). The failure detection mechanisms generate events that are propagated to Libvirt. VM Monitor uses the Libvirt C-language API to register and process these events to provide guest management that is completely transparent to the networking system software.

In certain embodiments, aspects disclosed may be practiced by—i. configuration for event monitoring and ii. switchover on failure detection.

Failure Monitoring Configuration:

Failure monitoring configuration may include a combination of Linux Kernel Configuration and various XML tags in the Libvirt XML file describing the virtual machine features. For PVPanic Linux Kernel may be built with CONFIG_PVPANIC and Libvirt XML file may contain IO Port number, as shown below, to propagate the virtual machine kernel panic to Libvirt via QEMU.

```
<panic>
    <address type='isa' iobase='0x505'/>
</panic>
```

Watchdog may be implemented using Intel i6300esb hardware emulation. In one implementation, the XML file may specify this hardware model and associated reset action as shown below.

```
<watchdog model='i6300esb' action='reset'>
    <alias name='watchdog0'/>
</watchdog>
```

QEMU-GA may be implemented as a daemon in the virtual machine which sends ping packets to the Host using virtio-serial transport mechanism. Libvirt XML file to configure QEMU-GA is shown below.

```
<channel type='unix'
    <source mode='bind' path='/usr/local/var/lib/libvirt/qemu/
    guest.agent.0.sock'/>
    <target type='virtio' name='org.qemu.guest_agent.0'/>
    <alias name='channel0'/>
    <address type='virtio-serial' controller='0' bus='0' port='1'/>
</channel>
```

Failure Monitoring Tunable Parameters:

In certain embodiments, the watchdog i6300esb may be tunable from 1 sec to 3 sec. QEMU-GA heart-beat may be tunable from 3 to 10 pings at 1 sec interval.

Figure 8:
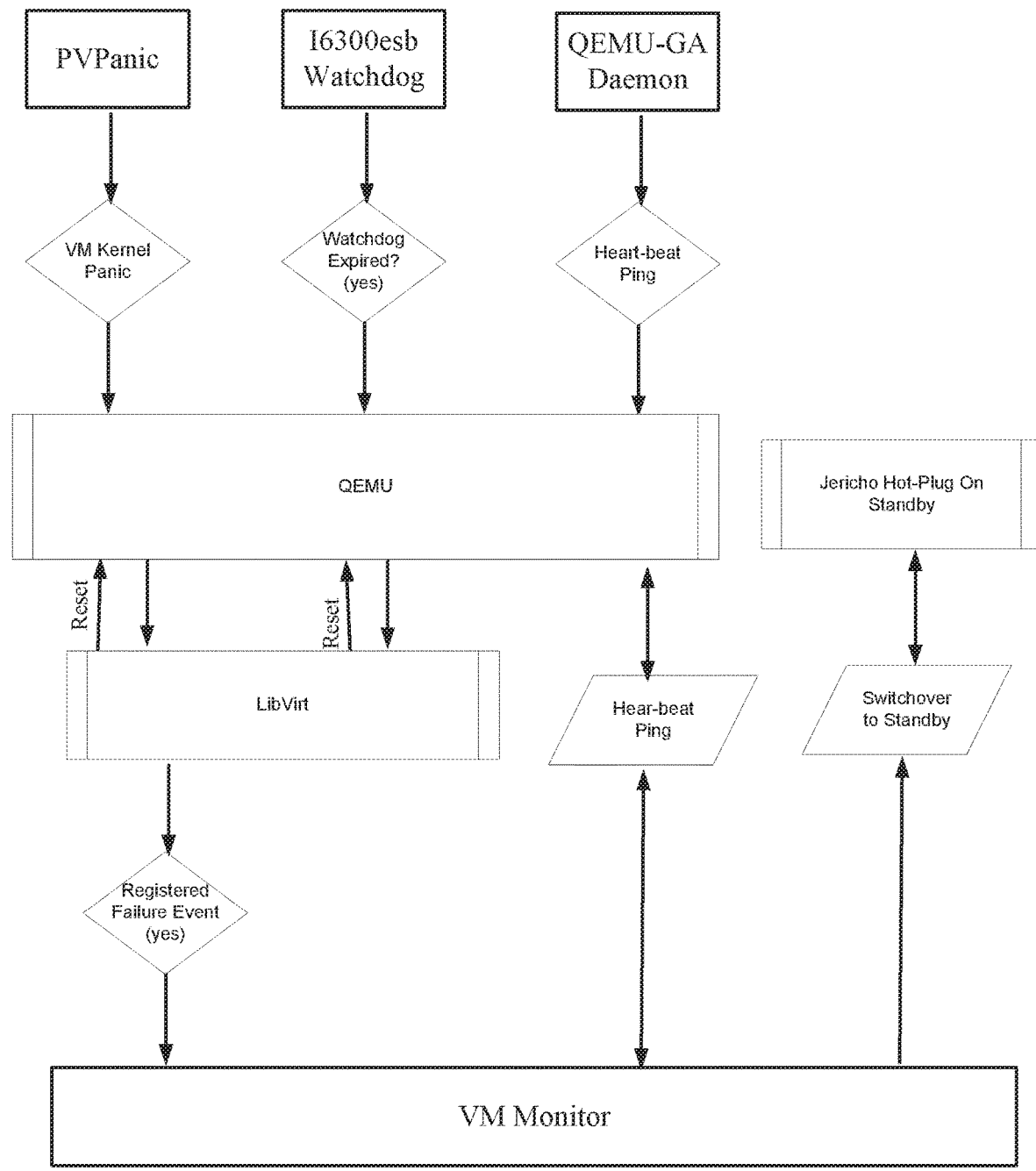
FIG. 8 is a flow/block diagram illustrating a failure monitoring and switchover process, according to certain aspects of the disclosure.

FIG. 8 is a flow/block diagram illustrating a failure monitoring and switchover process, according to certain aspects of the disclosure. The VM Monitor may register for various Libvirt failure events, such as On VM Kernel Panic, PV Panic sends failure indication to Libvirt via QEMU.

On i6300esb watchdog expiration, Libvirt receives failure indication via QEMU.

Both failures above triggers VM reset by Libvirt.

Both failure events are propagated to VM Monitor.

VM Monitor uses virtio-serial to send and receive heart-beat ping packets to and from QEM U-GA.

On receiving failure events from Libvirt or on heart-beat loss, VM Monitor sends switchover command to Standby VM QEMU-GA.

Standby VM assumes active role and in the process initiates Jericho hot plug. Hot-plug takes 5 sec for each Jericho present in the line card.

In certain embodiments, a non-transitory machine-readable or computer-readable medium is provided for storing data and code (instructions) that can be executed by one or more processors. Examples of non-transitory machine-readable or computer-readable medium include memory disk drives, Compact Disks (CDs), optical drives, removable media cartridges, memory devices, and the like. A non-transitory machine-readable or computer-readable medium may store the basic programming (e.g., instructions, code, program) and data constructs, which, when executed by one or more processors, provide the functionality described above. In certain implementations, the non-transitory machine-readable or computer-readable medium may be included in a network device and the instructions or code stored by the medium may be executed by one or more processors of the network device causing the network device to perform certain functions described above. In some other implementations, the non-transitory machine-readable or computer-readable medium may be separate from a network device, but can be accessible to the network device such that the instructions or code stored by the medium can be executed by one or more processors of the network device causing the network device to perform certain functions described above. The non-transitory computer-readable or machine-readable medium may be embodied in non-volatile memory or volatile memory.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

Although specific embodiments have been described, various modifications, alterations, alternative constructions, and equivalents are also encompassed within the scope of described embodiments. Embodiments described herein are not restricted to operation within certain specific data processing environments, but are free to operate within a plurality of data processing environments. Additionally, although certain implementations have been described using a particular series of transactions and steps, it should be apparent to those skilled in the art that these are not meant to be limiting and are not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software may also be provided. Certain embodiments may be implemented only in hardware, or only in software (e.g., code programs, firmware, middleware, microcode, etc.), or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including, but not limited to, conventional techniques for inter-process communications, and different pairs of processes may use different techniques, or the same pair of processes may use different techniques at different times.

The specifications and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A network device, comprising:
a memory;
a processor comprising virtualization extensions and configured to load instructions from the memory and execute the instructions to provide:
a hypervisor, comprising:
an operating system for managing memory, input-output devices and scheduling of execution of tasks on the processor;
a kernel virtualization module for the operating system that is configured to execute in kernel mode and use the virtualization extensions of the processor for enabling virtualization;
one or more user virtualization processes configured to:
execute in user mode and interface with the kernel virtualization module for enabling virtualization, and
provide access to virtual hardware resources to a virtual machine;
a monitor module configured to execute in the user mode, and monitor the virtual hardware resources associated with virtual machines;
an active virtual machine, instantiated by the hypervisor, for processing network packets;
a standby virtual machine, instantiated by the hypervisor, that does not process network packets while the active virtual machine processes the network packets; and
the monitor of the hypervisor further configured to:
detect a change in a status of a virtual hardware resource associated with the active virtual machine;
determine, based on the change in the status of the virtual hardware resource, to switch the standby virtual machine to the active virtual machine; and
switch the standby virtual machine to the active virtual machine.

2. The network device of claim 1, wherein the monitor is further configured to attach hardware resources to the active virtual machine after performing the switch of the standby virtual machine to the active virtual machine.

3. The network device of claim 2, wherein the hardware resource is a network interface.

4. The network device of claim 2, wherein the hardware resource is a display console.

5. The network device of claim 1, wherein the change in the status of the virtual hardware resource is in response to a guest operating system panic event from a guest operating system executing in the virtual machine.

6. The network device of claim 1, wherein the change in the status of the virtual hardware resource is in response to a guest process panic event from the virtual machine.

7. The network device of claim 1, wherein the change in the status of the virtual hardware resource is in response to a watchdog timer event from the virtual machine.

8. The network device of claim 1, wherein the change in the status of the virtual hardware resource is in response to a lack of receiving a ping event for a pre-determined amount of time.

9. The network device of claim 1, wherein the kernel virtualization module is a kernel-based virtual machine (KVM).

10. The network device of claim 1, wherein the one or more user virtualization processes are one or more of LibVirt or Qemu.

11. A method, comprising:
determining change in status of a virtualized hardware resource associated with an active virtual machine, wherein
the active virtual machine processes network packets and is hosted by host software that includes an operating system and a kernel virtualization module, and
the virtualized hardware resources are virtualized by one or more user virtualization processes;
executing the kernel virtualization module for the operating system in kernel mode and using virtualization extensions for enabling virtualization;
executing the one or more user virtualization processes in user mode to interface with the kernel virtualization module for enabling virtualization;
providing, by the one or more user virtualization processes, access to the virtualized hardware resources to a virtual machine;

monitoring, by a monitor module configured to execute in the user mode, the virtual hardware resources associated with virtual machines;

determining, by the monitor module, based on the change in the status of the virtual hardware resource, to switch a standby virtual machine to active virtual machine, wherein the standby virtual machine does not process network packets while the active virtual machine processes the network packets; and switching, by the monitor module, the standby virtual machine to the active virtual machine.

12. The method of claim 11, further comprising attaching hardware resources to the active virtual machine after switching of the standby virtual machine to the active virtual machine.

13. The method of claim 12, wherein the hardware resource is a network interface.

14. The method of claim 12, wherein the hardware resource is a display console.

15. The method of claim 11, wherein the change in the status of the virtual hardware resource is in response to a guest operating system panic event from a guest operating system executing in the virtual machine.

16. The method of claim 11, wherein the change in the status of the virtual hardware resource is in response to a guest process panic event from the virtual machine.

17. The method of claim 11, wherein the change in the status of the virtual hardware resource is in response to a watchdog timer event from the virtual machine.

18. The method of claim 11, wherein the change in the status of the virtual hardware resource is in response to a lack of receiving a ping event for a pre-determined amount of time.

19. The method of claim 11, wherein the kernel virtualization module is a kernel-based virtual machine (KVM).

20. The method of claim 11, wherein the one or more user virtualization processes are one or more of LibVirt or Qemu.

* * * * *